United States Patent
Wood

(10) Patent No.: US 9,882,652 B2
(45) Date of Patent: Jan. 30, 2018

(54) METHODS AND SYSTEMS FOR OPTICAL DETECTION

(71) Applicant: LGS INNOVATIONS LLC, Herndon, VA (US)

(72) Inventor: Thomas H. Wood, Holmdel, NJ (US)

(73) Assignee: LGS INNOVATIONS LLC, Herndon, VA (US)

(*) Notice: Subject to any disclaimer, the term of this patent is extended or adjusted under 35 U.S.C. 154(b) by 282 days.

(21) Appl. No.: 14/698,562

(22) Filed: Apr. 28, 2015

(65) Prior Publication Data

US 2016/0323040 A1    Nov. 3, 2016

(51) Int. Cl.
*H04B 10/06* (2006.01)
*H04B 10/61* (2013.01)

(52) U.S. Cl.
CPC ......... *H04B 10/614* (2013.01); *H04B 10/612* (2013.01)

(58) Field of Classification Search
CPC .. H04B 10/614; H04B 10/613; H04B 10/612; H04B 10/6161; H04B 10/548; H04B 10/5161
USPC ....... 398/202, 204, 205, 206, 207, 208, 209, 398/210, 212, 213, 214, 135, 136, 183, 398/188, 189, 190, 191, 192, 193, 194, 398/65, 184, 152, 158, 159
See application file for complete search history.

(56) References Cited

U.S. PATENT DOCUMENTS

| | | | | |
|---|---|---|---|---|
| 8,682,181 B2* | 3/2014 | Liu | ..................... | H04B 10/5161 375/239 |
| 8,744,275 B2* | 6/2014 | Liu | ..................... | H04B 10/2507 398/183 |
| 9,325,427 B1* | 4/2016 | Oveis Gharan | ...... | H04B 10/612 |
| 2014/0341595 A1* | 11/2014 | Harley | ................. | H04B 10/616 398/208 |
| 2014/0356003 A1* | 12/2014 | Randel | ................. | H04B 10/616 398/210 |
| 2014/0376929 A1* | 12/2014 | Takechi | ............... | H04B 10/614 398/212 |

* cited by examiner

*Primary Examiner* — Hanh Phan
(74) *Attorney, Agent, or Firm* — Baker and Hostetler LLP

(57) ABSTRACT

The present application is directed an optical communication method. The method includes a step of receiving a signal at a single-polarization receiver. The method also includes a step of detecting, through the single-polarization receiver, the signal including a symbol with a pulse position modulation pulse and an additional modulation. The method also includes a step of decoding a first portion of bits carried by the symbol based on a position of the PPM pulse. Further, the method includes a step of decoding a second portion of the bits at the position through an additional modulation. The application is also directed to an apparatus for optical communication. In addition, the application is directed to an optical communication method which recovers two polarization components form the signal each carrying independent data. Further, the application is directed to an optical communication method that recovers two frequencies of the detected signal.

20 Claims, 8 Drawing Sheets

METHODS AND SYSTEMS FOR OPTICAL DETECTION

CROSS-REFERENCE TO RELATED APPLICATIONS

The subject matter of the instant application is related to U.S. Pat. No. 8,744,275 filed Mar. 5, 2011 and granted Jun. 3, 2014, the contents of which is incorporated by reference in its entirety. The subject matter of this application is also related to U.S. Pat. No. 8,682,181 filed Mar. 5, 2011 and granted Mar. 25, 2014, the contents of which is incorporated by reference in its entirety.

BACKGROUND

1. Field

The present invention relates to optical communication modulation and detection methods, apparatuses and systems. The present invention also relates to optical modulation and detection methods in coherent optical transmission systems.

2. Related Art

Over the last decade, there has been continued research in the field of optical communication systems to improve receiver sensitivity. Particular emphasis has been placed upon free-space optical communications. Moreover, research has been conducted in increasing receiver sensitivity and/or reducing the required signal photons per bit (ppb) in order to improve transmission link performance.

Generally, optical transmission links transmit both optical polarizations with equal attenuation. For example, in free-space optical links, the signal-carrying light is conveyed from the transmitter to the receiver via a free-space medium. Telescopes at both ends of the links collimate and collect light before and after propagation. If the link is bi-directional and polarization isolation is needed to suppress cross-talk, the transmitter and/or receiver telescopes may be configured to pass only one polarization. In such instances, modulation formats requiring both optical polarizations simply will not work as expected. That is, the data carrying capacity as well as the sensitivity of the receiver will significantly be reduced.

Data transfer rates in telecommunication systems are currently at about 100 Gb/s per wavelength. While dual polarization modulation formats exhibit good capacity, other modulation schemes are being researched and developed to obtain good receiver sensitivity and capacity in a commercial capacity in the telecommunications field.

What is desired in the art is an optical link configured to support a single polarization.

What is also desired in the art is an optical link that employs less hardware while maintaining current standards of sensitivity.

What is further desired in the art is an optical link that employs less hardware while maintaining current standards of capacity.

What is yet even further desired in the art is an optical link that exhibits improved sensitivity.

What is yet even further desired in the art is an optical link that can operate on a single polarization and maintain nearly the sensitivity of an optical link employing a modulation format requiring both optical polarizations.

SUMMARY

The foregoing needs are met, to a great extent, by the invention, with high-sensitivity optical detection methods, systems and apparatuses. The application is not limited to the subject matter described in the Summary section and is useful for purposes of introducing concepts explained in detail in the Detailed Description section.

One aspect of the application is directed to an optical communication method. The method includes a step of receiving a signal at a single-polarization receiver. The method also includes a step of detecting, through the single-polarization receiver, the signal including a symbol with a pulse position modulation pulse and an additional modulation. The method also includes a step of decoding a first portion of bits carried by the symbol based on a position of the PPM pulse. Further, the method includes a step of decoding a second portion of the bits at the position through an additional modulation.

Another aspect of the application is directed to an optical communication apparatus. The apparatus includes a single-polarization receiver front end that detects a signal including a symbol having a pulse position modulation (PPM) pulse. The apparatus also includes an analog-to-digital convertor (ADC) that converts the detected signal into a digital component. The apparatus also includes a processor, operably coupled to the single-polarization receiver and the ADC, the processor configured to decode a first non-zero portion of a plurality of bits carried by the symbol based on a position of the PPM pulse.

Yet even another aspect of the application is directed an optical communication method for recovering two polarization components. The method includes a step of receiving a signal at a receiver. The method includes a step of detecting, through the receiver, a signal including a symbol with a pulse position modulation (PPM) pulse and an additional modulation. The method also includes a step of recovering two polarization components from the detected signal, each of the polarization components carrying independent data. Moreover, the method includes a step of decoding a first portion of bits carried by the symbol based on a position of the PPM pulse. Further the method includes a step of decoding a second portion of the bits based on the additional modulation.

In a further aspect of the application, an optical communication method is described that receives a signal at a coherent receiver. The method also includes a step detecting, through the coherent receiver, a signal including a symbol with a pulse position modulation (PPM) pulse. The method also includes a step of recovering a first and a second frequency of the detected signal. Further, the method includes a step of decoding a first non-zero portion of bits carried by the symbol based on a position of the PPM pulse. In one embodiment, the method further includes a step of decoding a second non-zero portion of the plurality of bits carried by the symbol based on the additional modulation in the first frequency. In even a further embodiment, the position includes a timeslot in a frame, and the symbol in the timeslot of the first frequency is rotated by another timeslot with respect to a second symbol in the second frequency.

There has thus been outlined, rather broadly, certain aspects of the application in order that the detailed description thereof may be better understood, and in order that the present contribution to the art may be better appreciated. There are, of course, additional aspects of the application that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

Figure 1:
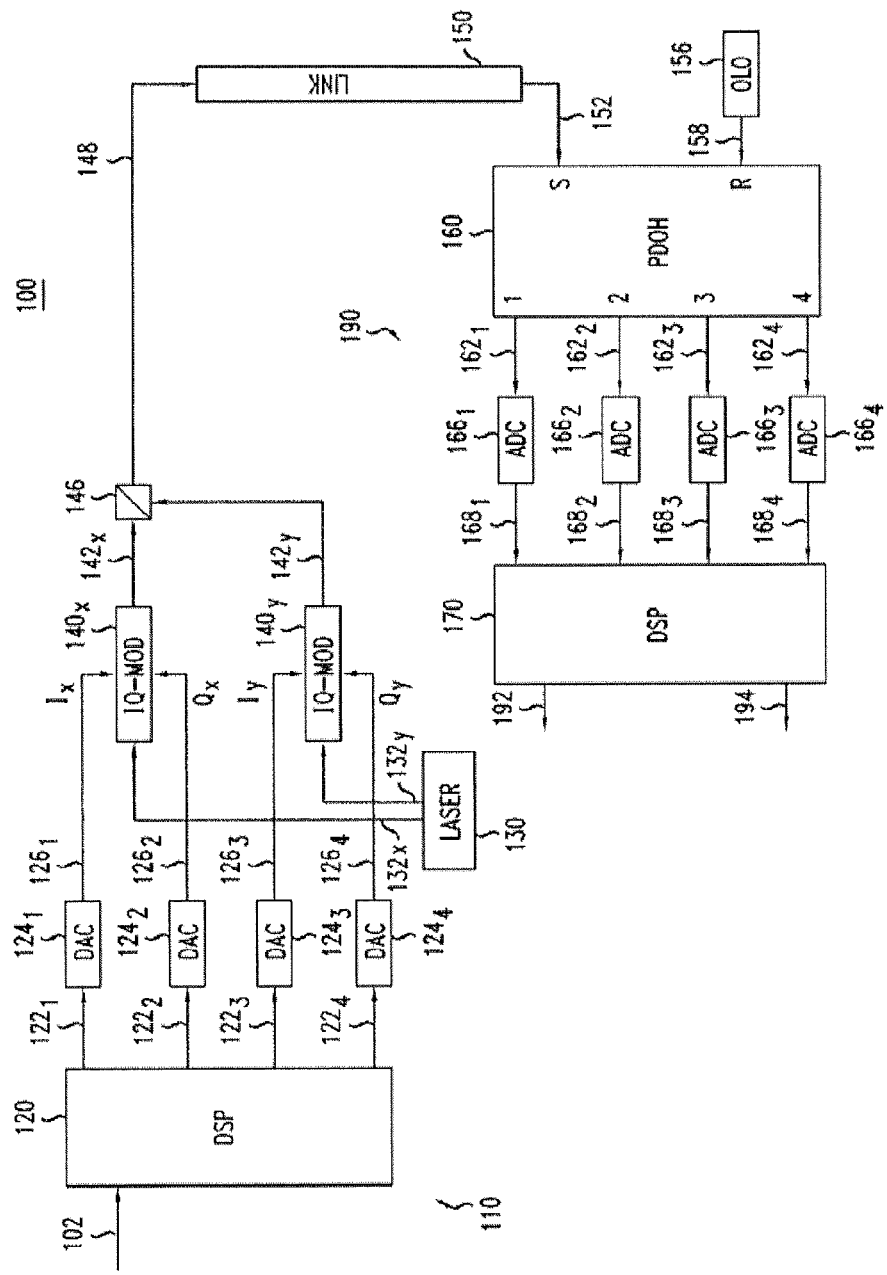
FIG. 1 illustrates a conventional dual polarization (PQP Classic) transmitter and receiver.

Before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used herein, the terms "light" and "optical" are understood to refer to electromagnetic radiation in any appropriate region of the electromagnetic spectrum and are not limited to visible light. For example, in embodiments of the application for use in the telecommunications industry, the term "light" and "optical" may include electromagnetic radiation with a wavelength included in the range of between about 1520 nm to 1630 nm encompassing the C-band and L-band transmission windows for telecommunication applications, and between about 1000 and 2000 nm for sensing applications.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

According to the present application, it has been determined that novel architectures and techniques may be employed via one or more modulation formats. For example, in one aspect, fewer structural components are employed to obtain substantially similar sensitivity and capacity characteristics in view of existing modulation formats. In another aspect, the application provides novel techniques to improve capacity and/or sensitivity in view of novel configurations of architectures. By so doing, the architectures and techniques discussed in this application promote a more robust and inclusive manner for handling propagation of signals from a transmitter to a receiver.

Before describing the novel aspects of the application in more detail, reference is first made to an optical modulation format introduced in related U.S. Pat. Nos. 8,744,275 and 8,682,181. The applications are commonly assigned to LGS Innovations, LLC. In these Patents, a combination of M-ary Pulse Position Modulation (M-PPM), Quadrature-Phase Shift Keying (QPSK), and Polarization Multiplexing (PM), was introduced and referred to as PQ-MPPM (2p-PQP or PQP Classic). These concepts may be applicable to one or more embodiments described below. FIG. 1 illustrates a block diagram of an optical transmission system 100. System 100 has an optical transmitter 110 and an optical receiver 190 connected via a transmission link 150. In one embodiment, transmission link 150 is a free-space optical link, e.g., a link connecting a satellite and a ground station (not shown). In another embodiment, transmission link 150 is an amplified fiber link having one or more optical amplifiers (not shown).

Transmitter 100 receives an input data stream 102 for transmission to receiver 190. In one embodiment, a digital-signal processor 120 processes data stream 102 as further described below in reference to FIGS. 2 and 3 to generate digital signals 122 1-122 4. Digital signals 122 1-122 4 undergo a digital-to-analog conversion in digital-to-analog converters (DACs) 124 1-124 4, respectively, to produce drive signals 126 1-126 4. Drive signals 126 1 and 126 2 are in-phase (I) and quadrature-phase (Q) drive signals corresponding to the x-polarization signal component, e.g., Ix 126 1 and Qx 126 2. Drive signals 126 3 and 126 4 are similar in-phase and quadrature-phase drive signals corresponding to the y-polarization signal component, e.g., Iy 126 3 and Qy 126 4.

An optical IQ modulator 140 x uses drive signals 126 1 and 126 2 to modulate an optical-carrier signal 132 X generated by a laser source 130 and to produce a modulated signal 142 X. An optical IQ modulator 140 y similarly uses drive signals 126 3 and 126 4 to modulate an optical-carrier signal 132 Y generated by laser source 130 and to produce a modulated signal 142 Y. In other embodiments, for example, optical modulation may be provided by an optical modulation means that includes at least one of a polarization-diversity I/Q modulator, a dual polarization optical modulator, a phase modulator, an intensity modulator, a Mach Zehnder modulator, a current modulated laser. The optical modulation means may be an array of one or more of the above described modulator or lasers in order to modulate the optical carrier by the drive signals. Also, note that the drive signals can be further amplified by RF amplifiers before driving the optical IQ modulators. A polarization beam combiner (PBC) 146 combines modulated signals 142 X and 142 Y to produce an optical polarization-division-multiplexed (PDM) signal 148, although those skilled in the art will recognize that other ways to combine modulated signals 142 X and 142 Y are possible.

Transmission link 150 receives signal 148 from beam combiner 146 for transmission to receiver 190. The PDM signal 148 may be further amplified, for example, by an Erbium Doped Fiber Amplifier (EDFA) (not explicitly shown in FIG. 1) prior to insertion on the transmission link 150. While propagating through transmission link 150, signal 148 is subjected to various transmission impediments, such as attenuation, chromatic dispersion (CD), polarization rotation, amplified spontaneous emission (ASE), and polarization-mode dispersion (PMD), and emerges at the receiver end of the transmission link as an optical signal 152.

Receiver 190 has an optical-to-electrical (O/E) converter 160 having (i) two input ports labeled S and R and (ii) four pairs of complementary output ports. Input port S receives optical signal 152. Input port R receives an optical reference signal 158 generated by an optical local oscillator (OLO) 156. Reference signal 158 has substantially the same optical-carrier frequency (wavelength) as signal 152. Reference signal 158 can be generated, e.g., using a tunable laser controlled by a wavelength-control loop (not explicitly shown in FIG. 1) that forces an output wavelength of the tunable laser to substantially track the carrier wavelength of signal 152. In various embodiments, optical local oscillator 156 may comprise a combination of tunable and/or non-tunable lasers, optical frequency converters, optical modulators, and optical filters appropriately connected to one another to enable the generation of reference signal 158.

O/E converter 160 mixes input signal 152 and reference signal 158 to generate eight mixed optical signals (not shown in FIG. 1). O/E converter 160 then converts the eight mixed optical signals into four electrical signals 162 1-162 4 that are indicative of complex values corresponding to two orthogonal polarization components of signal 152. For example, electrical signals 162 1 and 162 2 may be an analog in-phase signal and an analog quadrature-phase signal, respectively, corresponding to an x-polarization component of signal 152. Electrical signals 162 3 and 162 4 may similarly be an analog in-phase signal and an analog quadrature-phase signal, respectively, corresponding to a y-polarization component of signal 152.

In one embodiment, O/E converter 160 is a polarization-diverse 90° optical hybrid (PDOH) with four balanced photo-detectors coupled to its eight output ports. Various suitable PDOHs are commercially available, e.g., from Optoplex Corporation of Fremont, Calif., and CeLight, Inc., of Silver Spring, Md. Additional information on various O/E converters that can be used to implement O/E converter 160 in various embodiments of system 100 are disclosed, e.g., in U.S. Patent Publication No. 2010/0158521, U.S. Ser. No. 12/541,548 (filed on Aug. 14, 2009), and International Patent Application No. PCT/US09/37746 (filed on Mar. 20, 2009), all of which are incorporated herein by reference in their entirety.

Each of electrical signals 162 1-162 4 generated by O/E converter 160, optionally amplified in a corresponding amplifier (not shown), is converted into digital form in a corresponding one of analog-to-digital converters (ADCs) 166 1-166 4. Digital signals 168 1-168 4 produced by ADCs 166 1-166 4 are processed by a digital signal processor 170, e.g., as further described below in reference to FIGS. 3A-3C, to recover the data applied by data streams 102 and 104 to transmitter 110. The recovered data are outputted from receiver 190 via output signals 192 and 194, respectively.

Figure 2:
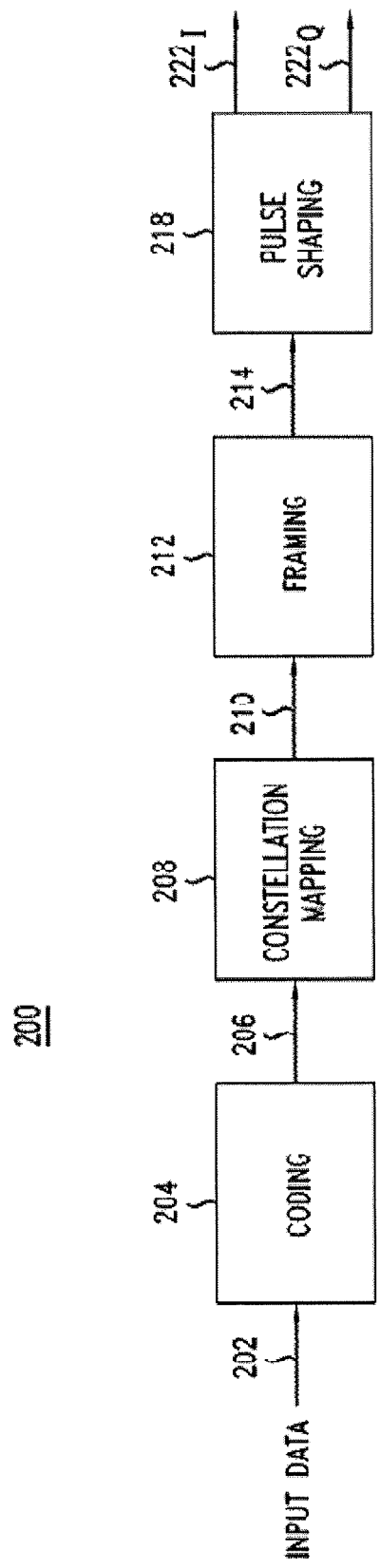
FIG. 2 illustrates the operation of a digital signal processor used in the transmitter.

FIG. 2 illustrates the operation of a digital signal processor 200 that can be used to implement digital signal processor 120 according to an embodiment. More specifically, FIG. 2 shows a block diagram of processor 200. Processor 200 processes an input data stream 202 to generate digital output signals 222I and 222Q. Input data stream 202 is applied to a coding module 204, where it is optionally interleaved and subjected to forward-error-correction (FEC) coding. A coded bit stream 206 produced by coding module 204 is applied to a constellation-mapping module 208, where it is converted into a corresponding sequence 210 of constellation symbols. The constellation used by constellation-mapping module 208 can be, for example, a PQ-MPPM constellation. In general, information bits are encoded through the positioning of pulse/s in a PPM format and through additional modulation of at least one of these pulses.

Symbol sequence 210 is applied to a framing module 212, where it is converted into a corresponding sequence 214 of data frames. When processor 200 is used to implement DSP 120, sequence 214 consists of two parallel subsequences, one corresponding to the X polarization and the other corresponding to the Y polarization. Frame sequence 214 produced by framing module 212 is then applied to a pulse-shaping module 218, where it is converted into output signals 222I and 222Q. Thus, a signal including a frame having a mapped symbol is modulated onto an optical carrier.

A frame sequence 214 produced by framing module 212 is applied to a pulse-shaping module 218, where it is converted into output signals 222I and 222Q. Pulse shaping implemented in pulse-shaping module 218 is a process of generating a digital waveform that, after being converted into a corresponding analog signal, can be applied to an optical modulator to modulate an optical-carrier signal, such as optical-carrier signal 132 X or 132 Y, so that the resulting modulated optical signal is modulated with symbols corresponding to the various blocks of frame sequence 214. In one configuration, oversampling may be applied, e.g., by duplicating each signal sample one or more times for output signals 222I and 222Q.

Figure 3A:
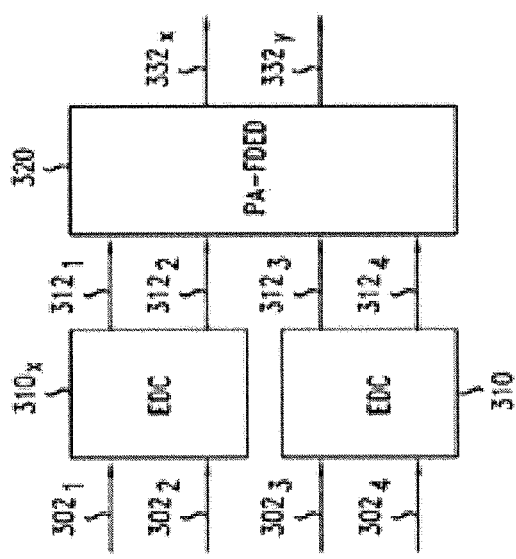
FIGS. 3A-C illustrates a digital signal processor used in the receiver.
Figure 3B:
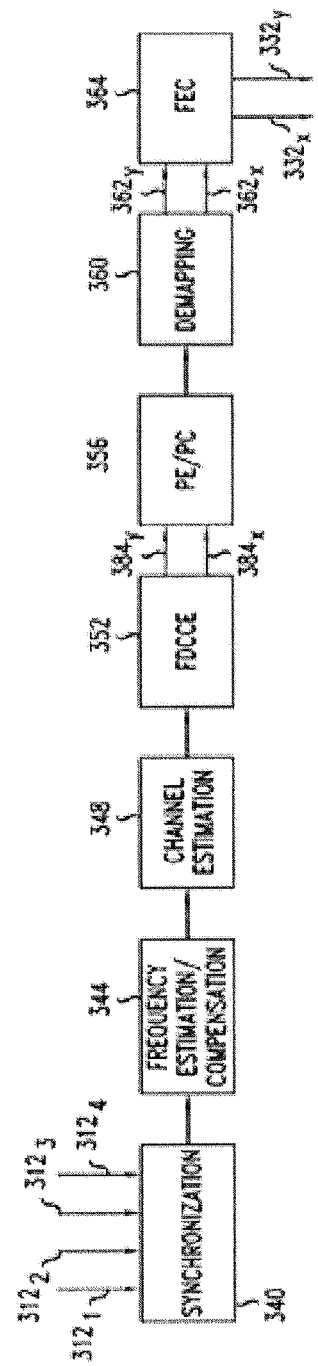
Figure 3C:
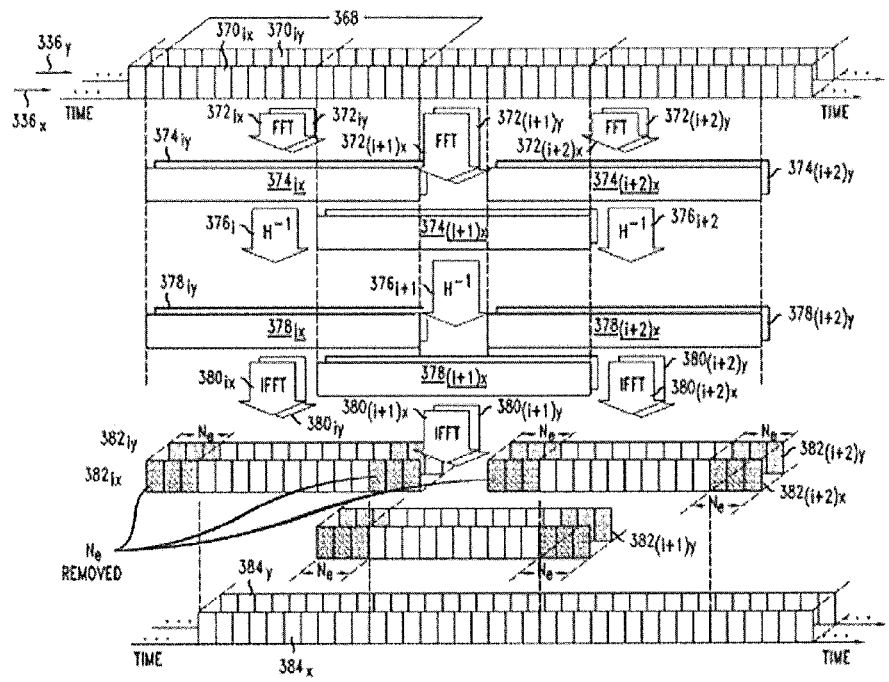

FIGS. 3A-3C illustrate the operation of a digital signal processor 300 that can be used to implement digital signal processor 170 according to one embodiment of the invention. More specifically, FIGS. 3A-3B show block diagrams of processor 300. FIG. 3C shows the processing implemented in an FDCCE (frequency-domain-channel-compensation/equalization) sub-module 352 of processor 300. When processor 300 is used as processor 170, input signals 302 1-302 4 correspond to signals 168 1-168 4, respectively, and output signals 332 $x$ and 332 $y$ correspond to output signals 192 and 194, respectively.

Electronic Dispersion Compensation (EDC) modules 310 perform digital signal processing that mitigates the detrimental effects of chromatic dispersion imposed on input signal 152 by fiber link 150. In particular, EDC module 310 $x$ processes input signals 302 1-302 2 corresponding to the first principal polarization axis of PDOH 160. Similarly, EDC module 310 $y$ processes input signals 302 3-302 4 corresponding to the second principal polarization axis, e.g., the y axis, of PDOH 160. X and Y polarizations used at the transmitter may or may not be aligned with the principal polarization axes of PDOH 160.

Dispersion-compensated signals 312 1-312 4 produced by EDC modules 310 $x$ and 310 $y$ are applied to a pilot-assisted frequency-division-equalization and decoding (PA-FDED) module 320 that processes these signals, e.g., as further described below in reference to FIGS. 3B-3C, to recover the original data streams applied to the transmitter for transmission, e.g., data streams 102 and 104 of FIG. 1. More specifically, PA-FDED module 320 generates data stream 332 $x$ that carries the data corresponding to the first independently modulated component of signal 152, e.g., component 142 X, and similarly generates data stream 332 $y$ that carries the data corresponding to the second independently modulated component of signal 152, e.g., component 142 Y.

FIG. 3B shows a block diagram of PA-FDED module 320 according to one embodiment. PA-FDED module 320 has a synchronization sub-module 340 that receives, as its input, dispersion-compensated signals 312 1-312 4. Synchronization sub-module 340 relies on the above-described properties of pilot-symbol block T1 (T1$x$ and T1$y$) to determine the start of each frame 230.

A frequency-estimation/compensation (FE) sub-module 344 that is located downstream from synchronization sub-module 340 performs electronic estimation and compensation of a mismatch between the carrier-frequency of input signal 152 and the frequency of reference signal 158. In one embodiment, FE sub-module 344 determines the phase of P(nmax), where nmax is the time slot corresponding to the maximum of the absolute value of function P(n) determined by synchronization sub-module 340. FE sub-module 344 then uses the phase of P(nmax) to calculate the frequency offset between signals 152 and 158. If the frequency offset is zero, then P(nmax) is real and its phase is zero. If the frequency offset is not zero, then P(nmax) is complex and its phase is directly related to the frequency offset and the duration of pilot-symbol block T1. Because the frequency offset may change over time, FE sub-module 344 performs the frequency-offset calculation for each received frame 230.

After the frequency offset is determined, FE sub-module 344 performs frequency-mismatch compensation by applying to each signal sample a phase shift equal to the frequency offset multiplied by $2\pi$ and the time elapsed between the start of the frame determined by synchronization sub-module 340 and the signal sample. Various FE modules that can be adapted to function as FE sub-module 344 are disclosed.

More specifically, using the a priori knowledge of body sequences KS1, KS2, KS3, and KS4, CE sub-module 348 constructs channel-response function H so that the application of that channel-response function to these body sequences transforms them into the received signal samples corresponding to these known body sequences. Note that an individual channel-response function H can be calculated by CE sub-module 348 for each frame 230, which enables the receiver to appropriately track time-dependent channels.

FIG. 3C also shows exemplary processing implemented in frequency-domain channel-compensation/equalization (FDCCE) sub-module 352. More specifically, the shown processing handles signal samples corresponding to the payload of a single transmitted frame and, as such, uses the channel-response function H determined by channel-estimation sub-module 348. For processing each new frame, FDCCE sub-module 352 uses a corresponding new channel-response function H determined by and received from CE sub-module 348.

As already indicated above, the symbols of phase estimation blocks Bn in frame 230 do not have cyclic prefixes. As a result, inter-block interference (IBI) occurs at the receiver. To mitigate the adverse effects of IBI, FDCCE sub-module 352 may perform, as further described below and with respect to FIG. 3C, overlap FDCCE processing with a sliding window 368 that has 2N consecutive signal samples from a sequence 366 of frequency-corrected signal samples corresponding to the payload of a received frame. Sequence 366 consists of two parallel sub-sequences, i.e., a sequence 366 x that corresponds to signals 312 1-312 2 and a sequence 366 y that corresponds to signals 312 3-312 4. Note that signal samples in sequence 366 x have contributions both from the symbols carried by signal 142 X and from the symbols carried by signal 142 Y. Signal samples in sequence 366 y similarly have contributions both from the symbols carried by signal 142 X and from the symbols carried by signal 142 Y (from FIG. 1).

For an i-th position of sliding window 368, FDCCE sub-module 352 applies: (i) a fast Fourier transform (FFT) 372 ix to a block 370 ix of 2N signal samples located inside the window and belonging to sequence 366 x and (ii) an FFT 372 iy to a block 370 iy of 2N signal samples located inside the window and belonging to sequence 366 y. FFT operation 372 ix converts block 370 ix into a corresponding block 374 ix of 2N frequency components. FFT operation 372 iy similarly converts block 370 iy into a corresponding block 374 iy of 2N frequency components.

Blocks 374 ix and 374 iy are subjected to a frequency-domain-equalization (FDE) procedure 376 i, which converts these blocks into blocks 378 ix and 378 iy. Similar to blocks 374 i, each of blocks 378 ix and 378 iy have 2N frequency components. FDE procedure 376 i includes the application of inverse channel-response function H-1, which is derived by FDCCE sub-module 352 from channel-response function H determined by channel-estimation sub-module 348. Since channel-response function H generally has a non-diagonal form (e.g., b(f)≠0 and c(f)≠0), FDE procedure 376 i mixes frequency components from blocks 374 ix and 374 iy to produce the corresponding frequency components for blocks 378 ix and 378 iy. Note that FFT operations 372 i do not have this feature because (i) block 374 ix is produced by operating solely on block 370 ix and without using any signal samples from block 370 iy and (ii) block 374 iy is produced by operating solely on block 370 iy and without using any signal samples from block 370 ix.

Blocks 378 ix and 378 iy are subjected to inverse FFT (IFFT) operations 380 ix and 380 iy, respectively. IFFT operation 380 ix converts block 378 ix into 2Ntime-domain signal samples, which form block 382 ix. IFFT operation 380 iy similarly converts block 378 iy into 2N time-domain signal samples, which form block 382 iy. Similar to FFT operations 372 i, IFFT operations 380 i do not mix the x and y blocks.

Block 382 ix is truncated to remove Ne signal samples from the beginning of the block and Ne signal samples from the end of the block, where Ne is a predetermined number chosen so that the signal samples affected by IBI are being truncated out. The remaining portion of block 382 ix having 2N-2Ne signal samples is used to form sequence 384 x of equalized signal samples that is output from FDCCE sub-module 352 to the downstream sub-modules of PA-FDED module 320. Block 382 iy is similarly truncated to remove Ne signal samples from the beginning of the block and Ne signal samples from the end of the block. The remaining portion of block 382 iy having 2N-2Ne signal samples is used to form sequence 384 y of equalized signal samples that is also output from FDCCE sub-module 352 to the downstream sub-modules of PA-FDED module 320.

Sliding window 368 is shifted down sequences 366 x and 366 y by 2N-2Ne signal samples to the (i+1)-th position, and the processing that is described above for the i-th is repeated for the (i+1)-th position. The shifts of sliding window 368 by 2N-2Ne signal samples and the corresponding processing are repeated until all of the payload symbols of the corresponding frame 230 for both X- and Y-polarizations have been recovered.

In one configuration, Ne=L/2 and 2N-2Ne=NDS, where L is the length of cyclic prefix CP in pilot-symbol blocks T2 and T3 (FIG. 2C), and NDS is the length of a symbol block (S) in frame 230. In this configuration, the processing performed at the i-th position of sliding window 368 recovers all symbols of payload-symbol block Si in frame 230. To recover the symbols of the first payload symbol block in the frame (DS1), sliding window 368 is positioned so that the first Ne signal samples inside the window belong to pilot-symbol block T3 of the same frame. To recover the symbols of the last payload-symbol block in the frame (DSn), sliding window 368 is positioned so that the last Ne signal samples inside the window belong to pilot-symbol block T1 of the next frame.

Note that, as illustrated above, CE sub-module 348 can perform channel-estimation and FDCCE sub-module 352 can perform block-overlap processing for polarization-division-multiplexed signals in a manner that enables FDCCE sub-module 352 to apply channel-response-compensation and polarization-demultiplexing procedures in a combined, intertwined, non-serial manner that advantageously saves processing time and/or power.

Figure 4:
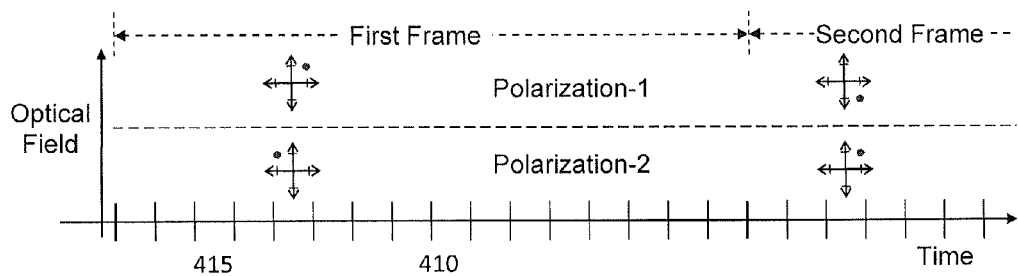
FIG. 4 illustrates a PQP Classic modulation format with signals propagating in two frames.

FIG. 4 illustrates the PQP Classic modulation format. This drawing represents the optical field as a function of time. Time in this case is divided into "Frames" and each frame 410, 420 is further divided into 16 timeslots. In one timeslot in each frame, a signal 415, 425 is sent on each polarization. In this example, the symbol is a QPSK modulated signal, and the same timeslot is occupied in each frame in the two polarizations. This format implements 16-PPM, i.e., M=16, because only one of the 16 timeslots in each frame carries optical energy. It implements QPSK because QPSK signals are transmitted and it implements Polarization Multiplexing (PM) because light is sent on both polarizations PQP Classic relies on the ability of the link to carry both polarizations. However, if one polarization is blocked, that polarization will not be received and both the data carrying capacity as well as the sensitivity of the receiver will be compromised.

1p-QP Modulation Format

Figure 5:
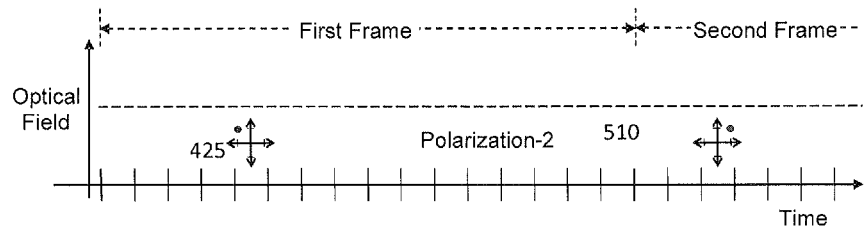
FIG. 5 illustrates a 1p-QP modulation format with a signal propagating in one of the two polarization frames according to an embodiment.

Another aspect of the application is directed to a technique to permit operation on a single-polarization optical link whereby fewer hardware components, such as for example, plural IQ modulators, are required. Specifically, FIG. 5 illustrates a modulation format, referred to herein as "1p-QP", wherein the receiver is configured to pass a single-polarization link. In other words, one polarization has been eliminated. Thus, all of the information is carried in the second or other polarization.

Throughout the application, the expression single-polarization when used to characterize the optical receiver is generally intended to refer to an apparatus that does not demodulate the modulated input optical signal in a way that depends on a state of polarization thereof. More particularly, the optical receiver may be one of the following: (i) responsive to light in only one polarization such that light entering the receiver on the orthogonal polarization is substantially ignored, or (ii) signals are substantially recovered without reference to the polarization of the incident light such that optical signals on either orthogonal polarization will be substantially treated the same, e.g., a receiver is not capable of receiving and decoding modulation formats that carry independent data on two orthogonal polarizations.

As shown in FIG. 5, the information carried on the optical signal 425 is in the second polarization 510. While this may have some impact on the capacity of the link, it has been determined that generally a majority of the information is carried in the PPM portion of the format.

Figure 6:
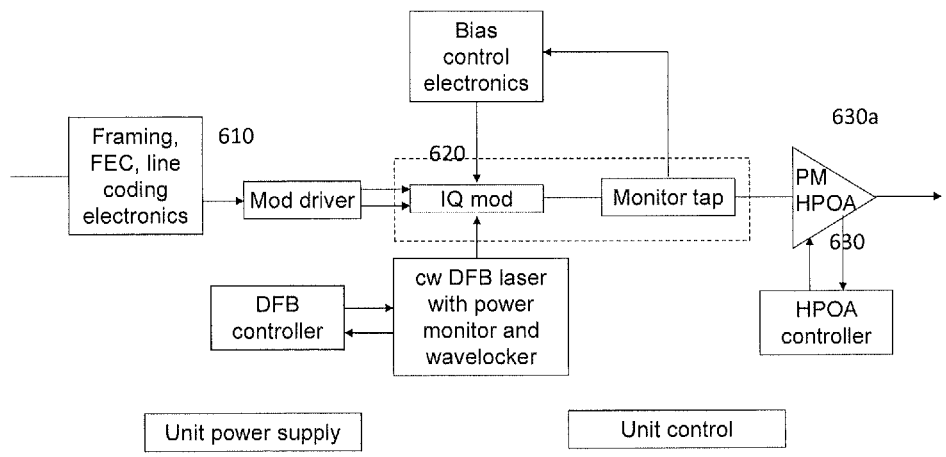
FIG. 6 illustrates a single polarization transmitter for a 1p-QP modulation format according to an embodiment.

According to another embodiment, a 1p-QP transmitter 600 is illustrated in FIG. 6. In comparison to the PQP Classic transmitter illustrated in FIG. 1, transmitter 600 includes a single modulation driver 610 and a single IQ modulator 620. In addition, the high-power optical amplifier (HPOA) 630 also may include a polarization maintaining component 630a.

Figure 7:
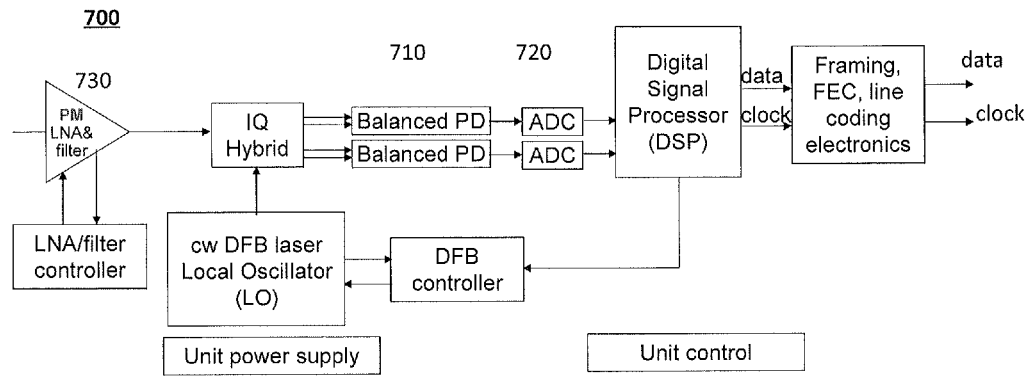
FIG. 7 illustrates a single polarization receiver for a 1p-QP modulation format according to an embodiment.

According to yet another embodiment, a 1p-QP receiver 700 is illustrated in FIG. 7. The receiver 700 may work in combination with the transmitter 600 illustrated in FIG. 6. In comparison to the PQP Classic receiver, receiver 700 requires half the number of balanced photodiodes 710 and analog to digital converters (ADCs) 720. In an exemplary embodiment, receiver 700 includes two balanced photodiodes 710 and two ADCs. Moreover, the low noise amplifier and filter 730 in the receiver 700 may include a polarization maintaining component 730a. The polarization maintaining component may help reduce noise and interference.

As will be discussed in more detail below in accordance with Table 1, various characteristics are presented for PQP Classic and 1p-QP modulation formats, respectively. Theoretical receiver sensitivities are provided in terms of the required photons-per-bit (PPB) for a given bit-error ratio (BER), and are generally expressed in dB. Columns are also provided for DPSK, Dual-Polarization QPSK, and M-PQP at M values of 2, 4, 6, 8, 16 and 32. Of particular importance, as indicated by the results in Table 1, is the data rate reduction for 1p-QP. In an exemplary embodiment, in the range of between M=2 and 32, the data rate reduction is generally less than about 40% of that exhibited for PQP Classic modulation formats. In a further exemplary embodiment, in the range of between M=4 and 32, the data rate reduction for 1p-QP is less than about 35% of that exhibited for PQP Classic modulation formats.

For example, at M=2 slots, with a 53.4 GSa/sec ADC operating with two times (2×) oversampling, which leads to 26.7 Gtimeslots/sec, the pre-FEC bit rate of PQP Classic is about 66.8 Gb/s. Meanwhile, the pre-FEC bit rate for M=2 slots for 1p-QP is 40.1 Gb/s. The theoretical sensitivity of 1p-QP, however, is fairly close and within about 7% or about 0.31 dB of PQP Classic at M=2, i.e., 5.7 dB versus 6.0 dB PPB. In another example for M=4 slots, with a 53.4 GSa/sec ADS operating with 2× oversampling, e.g., 26.7 Gtimeslots/sec, the pre-FEC bit rate of PQP Classic is about 40.1 Gb/s, while the pre-FEC bit rate for 1p-QP is 26.7 Gb/s. In this embodiment at M=4 slots, the theoretical sensitivity of 1p-QP is within about 9% or about 0.38 dB of PQP Classic.

TABLE 1

| | | | DPSK | DP-QPSK | M-PQP, etc. | | | | |
|---|---|---|---|---|---|---|---|---|---|
| | PPM order = M | | 1 | 1 | 2 | 4 | 8 | 16 | 32 |
| PQP-Classic, FQP | PPM bits/symbol | Bits/symbol | 0 | 0 | 1 | 2 | 3 | 4 | 5 |
| | Phase bits/symbol | Bits/symbol | 1 | 4 | 4 | 4 | 4 | 4 | 4 |
| | Total bits/symbol | Bits/symbol | 1 | 4 | 5 | 6 | 7 | 8 | 9 |
| | Symbol rate | Gsymbols/sec | 26.7 | 26.7 | 13.4 | 6.7 | 3.3 | 1.7 | 0.8 |
| | Pre-FEC bit rate | Gb/sec | 26.7 | 106.8 | 66.8 | 40.1 | 23.4 | 13.4 | 7.5 |
| | Theoretical Rx Sensitivity @ BER = $10^{-3}$ | PPB (dB) | 8.6 | 6.8 | 5.7 | 4.9 | 4.3 | 3.9 | 3.6 |
| | Gain over DPSK | PPB (dB) | 0.0 | 1.8 | 2.9 | 3.7 | 4.3 | 4.7 | 5.0 |
| 1p-QP | PPM bits/symbol | Bits/symbol | 0 | 0 | 1 | 2 | 3 | 4 | 5 |
| | Phase bits/symbol | Bits/symbol | 1 | 2 | 2 | 2 | 2 | 2 | 2 |
| | Total bits/symbol | Bits/symbol | 1 | 2 | 3 | 4 | 5 | 6 | 7 |
| | Symbol rate | Gsymbols/sec | 26.7 | 26.7 | 13.4 | 6.7 | 3.3 | 1.7 | 0.8 |
| | Pre-FEC bit rate | Gb/sec | 26.7 | 53.4 | 40.1 | 26.7 | 16.7 | 10.0 | 5.8 |
| | Theoretical Rx Sensitivity @ BER = $10^{-3}$ | PPB (dB) | 7.9 | 6.8 | 6.0 | 5.3 | 4.7 | 4.3 | 4.0 |
| | Gain over DPSK | PPB (dB) | 0.0 | 1.1 | 1.9 | 2.6 | 3.2 | 3.6 | 4.0 |
| | Sensitivity penalty 1p vs. 2p | PPB (dB) | −0.7 | 0.00 | 0.31 | 0.38 | 0.38 | 0.39 | 0.35 |
| Dual-PQP | PPM bits/symbol | Bits/symbol | 0 | 0 | 2 | 4 | 6 | 8 | 10 |
| | Phase bits/symbol | Bits/symbol | 2 | 4 | 4 | 4 | 4 | 4 | 4 |
| | Total bits/symbol | Bits/symbol | 2 | 4 | 6 | 8 | 10 | 12 | 14 |
| | Symbol rate | Gsymbols/sec | 26.7 | 26.7 | 13.4 | 6.7 | 3.3 | 1.7 | 0.8 |
| | Pre-FEC bit rate | Gb/sec | 53.4 | 106.8 | 80.1 | 53.4 | 33.4 | 20.0 | 11.7 |
| | Theoretical Rx Sensitivity @ BER = $10^{-3}$ | PPB (dB) | 7.9 | 6.8 | 6.0 | 5.3 | 4.7 | 4.3 | 4.0 |
| | Gain over DPSK | PPB (dB) | 0.0 | 1.1 | 1.9 | 2.6 | 3.2 | 3.6 | 4.0 |
| | Sensitivity penalty 1p vs. 2p | PPB (dB) | −0.7 | 0.00 | 0.31 | 0.38 | 0.38 | 0.39 | 0.35 |

According to Table 1, PQP Classic exhibits a significant improvement in receiver sensitivity over both DPSK and Dual-Polarization QPSK. In similar fashion, 1p-QP also exhibits improved receiver sensitivity over DPSK and Dual-Polarization QPSK. According to an embodiment, it is envisaged that the sensitivity penalties associated with moving from PQP Classic to 1p-QP are modest and can be accommodated in most link budgets.

Figure 8:
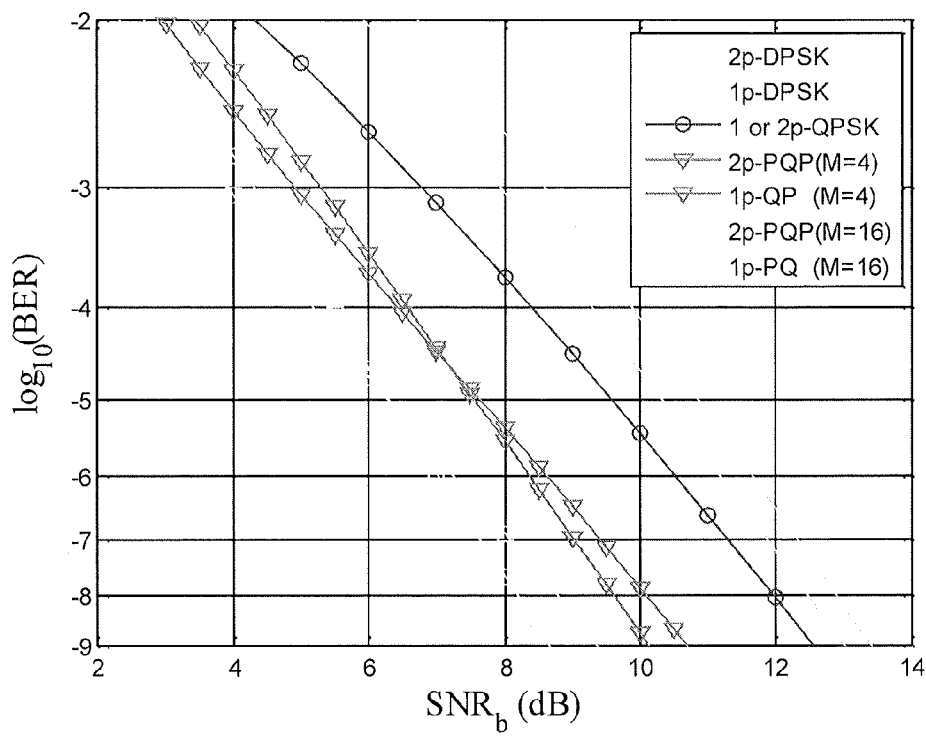
FIG. 8 illustrates receiver sensitivities for single and double polarizations of different modulation formats according to an embodiment.

According to even another embodiment, FIG. 8 illustrates a graphical representation of the results based upon calculations of the theoretical received Bit Error Rate (BER) performance versus received power in photons per bit (PPB), or signal-to-noise ratio (SNRb) for several modulation formats. Of particular interest in FIG. 8 is the comparison of 1p-QP with PQP Classic. This is shown for both M=4 and 16. The results for M=4 are depicted by triangles, and the results for M=16 are depicted by squares. For BERs of interest for most systems, i.e., $10^{-3}$ or $10^{-2}$ or higher, the penalty of moving from PQP Classic to 1p-QP is only a few tenths of a dB. Hence, while the small penalty may matter for a small handful of cases, 1p-QP will be more than adequate for almost all applications.

In particular, 1p-QP exhibits theoretical receiver sensitivities, at M=4, that are less than 5.5 dB PPB at BERs greater than $10^{-3}$. In addition, the receiver sensitivity, at M=16, is less than 4.3 dB PPB at BERs greater than $10^{-2}$. Thus, 1p-QP at least exhibits better sensitivity than either QPSK or DPSK.

Figure 9:
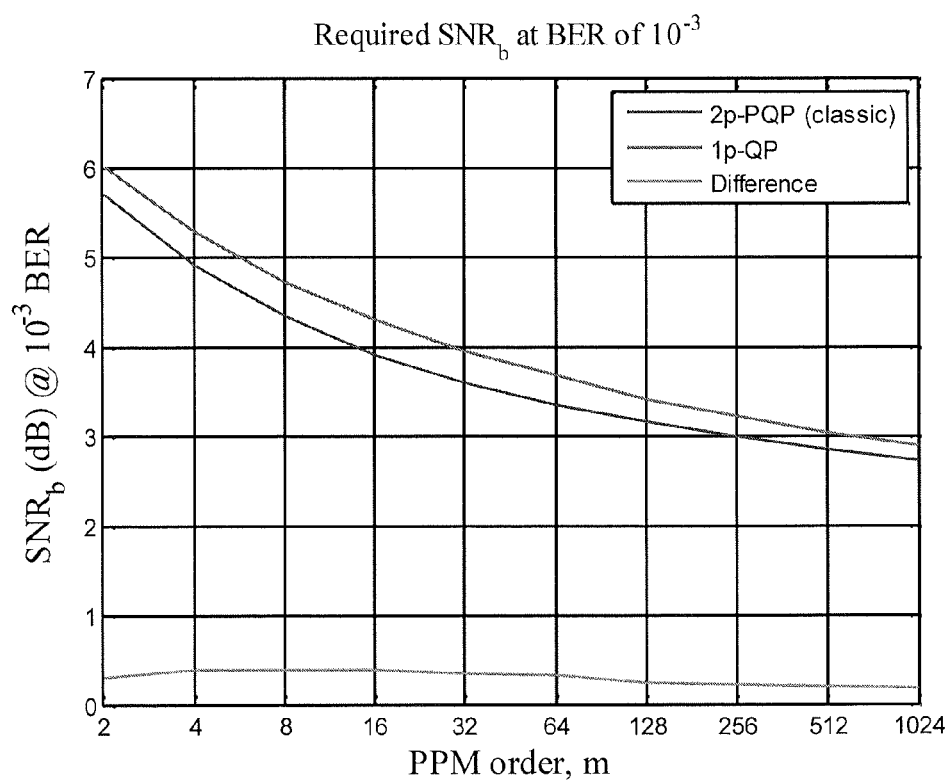
FIG. 9 illustrates a sensitivity difference between 2p-PQP and 1p-QP modulation formats according to an embodiment.

According to another embodiment, FIG. 9 illustrates the difference in required PPB for PQP Classic, e.g., 2p-PQP, and 1p-QP at a BER of $10^{-3}$ for several values of M. PQP Classic is characterized by the lower of the two substantially parallel negatively sloped lines, while 1p-QP is characterized by the upper negatively sloped line. These lines extend from left to right between about 6 and 3 dB. The difference between these two lines is less than about 0.5 dB for all M values. This is characterized by the trend line at about 0.5 dB at the lower part of the graph. According to the calculation, 1p-QP can be seen as a very attractive modulation format. This may especially be the case where transmission is limited to a single polarization.

The theoretical curves in each of FIGS. 8 and 9 are based on the low noise amplifiers (LNAs) in the receivers being substantially perfect. In other words, they exhibit a noise figure of exactly 3 dB. It is noted, however, that actual LNA noise figures are always slightly higher and will degrade practical receiver sensitivities. In addition, polarization-maintaining LNAs may have slightly higher noise figures than non-polarization-maintaining LNAs and may further degrade practical 1p-QP sensitivities.

Dual-PQP Modulation Format

Figure 10:
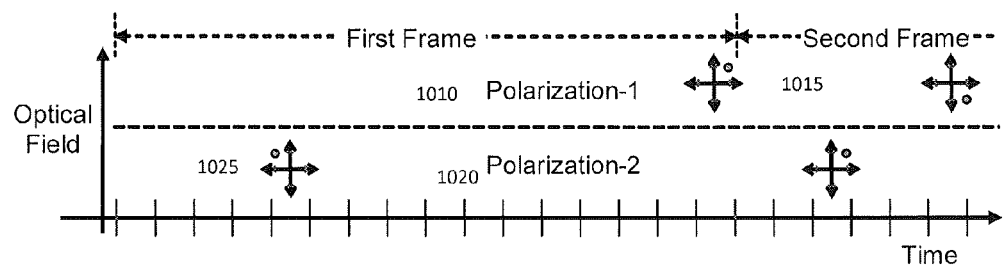
FIG. 10 illustrates a dual polarization PQP modulation format with independent data sent each polarization according to an embodiment.

According to another aspect of the application, and as described above with respect to FIGS. 1-4, scenarios may exist where it is desirable, and sometimes even necessary, to operate links supporting both polarizations. In such cases, where the medium transmits both polarizations, it is envisaged to send independent data on each of these polarizations. This is referred to as Dual-PQP. In one embodiment, as illustrated in FIG. 10, the PPM symbols in Polarization-1 1010 are sent in timeslots that are independent of the timeslots used for Polarization-2 1020. This is illustrated by the symbols 1015 and 1025 being in different timeslots in the first firm and second frames, respectively. This has the effect of increasing the data rate in comparison to PQP Classic. However, it maintains a similar receiver sensitivity (in PPB) as 1p-QP. According to this application, the physical architecture is similar to that provided above for PQP Classic as shown, for example, in FIG. 1. However, Framing, FEC, and line coding electronics in both the transmitters and receivers, as well as the DSP code in the receiver, will need to be modified to operate in a Dual-PQP mode. While, in PQP-classic, the timeslot carrying the optical energy is constrained to be the same in both polarizations, in Dual-PQP, this constraint is eliminated. According to the present invention, this results in a significantly larger pre-FEC bit rate relative to PQP-classic, at the cost of only a very small decrease in receiver sensitivity (corresponding to only a very small increase in required PPB).

As shown in Table 1 above, Dual-PQP has the same theoretical receiver sensitivity as 1p-QP, yet it exhibits significantly higher capacity than 1p-QP and PQP Classic. This may be attributed to the Dual-PQP technique whereby two independent 1p-QP data streams on separate two polarizations in links that support dual polarization. According to the application, different modulation formats have been developed with different architectures to accommodate the demands and constraints of any given link.

According to an embodiment, the dual-PQP modulation format includes a data input sequence that is grouped for encoding according to the subsequently-described format. Namely, the input data sequence, e.g., 010111001001001101101100 . . . , is first grouped into sets of bits that are to be converted into dual-polarization QPSK-4PPM symbols. Since incoming bits are grouped into sets of 2*(log 2(m)+2) bits for encoding QPSK-mPPM symbols, the input data sequence is grouped into pluralities of bits, each plurality containing eight (8) (i.e., =2*(log 2 4+2)) bits for encoding as QPSK-4PPM symbols. Thus, the data steam is split into first, second, third, pluralities of bits, e.g., 01011100, 10010011, 01101100, . . . , for symbol 1, symbol 2, symbol 3, etc.

A first non-zero portion of the plurality of bits for each symbol, a log 2(m) portion of the bits for a symbol, are encoded according to M-PPM. Thus, the first 2(=log 2 4) bits of each symbol are encoded onto a 4-PPM pulse with its slot positions 1, 2, 3, and 4 representing 00, 01, 10, and 11, respectively. Note that other mappings between slot positions and data bits, such as those employing Gray coding, are possible. A second non-zero portion of the plurality of bits for each symbol is encoded according to a phase-modulated modulation scheme for the pulse encoded at the slot position. For example, of the remaining bits of the plurality of bits for the symbol to be encoded (in this case 6 bits), the next two bits for each symbol may be encoded through QPSK. The first four bits are then encoded onto the x-polarization of the pulse. In this example, the remaining bits of the plurality of bits for the symbol to be encoded (in this case 4 bits), the next 2 (=log 2 4) bits of the symbol are encoded onto a 4-PPM pulse as described above. Finally, the remaining 2 bits may be encoded through QPSK. The latter 4 bits are then encoded onto the y-polarization of the pulse Gray coding can be applied for QPSK so that phase states π/4, 3π/4, 5π/4, and 7π/4 represent 00, 01, 11, and 10, respectively.

A first plurality of bits (01011100) are to be encoded as symbol 1 of the DualPQ-4PPM symbols. A first non-zero portion (01) of the first plurality of bits is encoded according to PPM. Thus, a pulse on the x-polarization is inserted in slot position number 2. A second non-zero portion (01) of the first plurality of bits (01011100) is encoded according to the x-polarized quadrature phase modulated modulation format pulse at the so determined slot position (slot position number 2). A third non-zero portion (11) of the first plurality of bits is encoded according to PPM. Thus, a pulse on the y-polarization is inserted in slot position number 4. A fourth non-zero portion (00) of the first plurality of bits (01011100) is encoded according to the y-polarized phase modulated modulation format pulse at the so determined slot position (slot position number 4). In this manner, a plurality of bits (01011100) is encoded according to PPM and the phase and polarization states of the PPM pulse in a slot position.

Similarly, a second plurality of bits (10010011) for encoding as symbol 2 may be encoded by insertion of a PPM pulse in slot position number 3 to represent a first non-zero portion (10) of the second plurality of bits (10010011) in the x polarization of the pulse, with a second non-zero portion (01) of the second plurality of bits (10010011) encoded according to the x-polarized quadrature phase-shift modulation format pulse at the so determined slot position (slot position number 3). A third non-zero portion (00) of the second plurality of bits is encoded according to PPM. Thus, a pulse on the y-polarization is inserted in slot position number 1. A fourth non-zero portion (11) of the second plurality of bits (10010011) is encoded according to the y-polarized phase modulated modulation format pulse at the so determined slot position (slot position number 1).

In another embodiment, multi-pulse PPM may also be applied to improve the throughput (or data rate) of the transmitter. In multi-pulse PPM, optical pulses are transmitted in multiple times slots in each PPM symbol. For 1-pulse M-PPM, the number of pulse patterns in each symbol is m, and log 2(m) bits can be transmitted per symbol. For multi-pulse M-PPM, the number of pulse patterns in each symbol is M*(M−1)/2, and log 2(M*(M−1)/2) bits can be transmitted per symbol. For M=16, 2-pulse 16-PPM carries log 2(16*15/2)=6.9 bits per symbol, which is about 73% higher than that carried by 1-pulse 16-PPM. The increased data rate is at the expense of reduced receiver sensitivity or reduced immunity to noise. Using more than 2 pulses per PPM symbol further increases the data rate carried by the PPM, but at further reduced receiver sensitivity.

In even a further embodiment, a PQ-16PPM frame may include a representative frame of a frame sequence that comprises a plurality of pilot-symbol blocks (Tn) and a plurality of phase estimation blocks (Bn). For example, the frame may include (i) pilot-symbol blocks T1, T2, T3 and (ii) payload-symbol blocks B1, B2, . . . B100. One important difference between a pilot-symbol block and a phase estimation block is that the former has a cyclic prefix (CP, also sometimes more generally replaced with a guard interval) while the latter does not. The use of cyclic prefixes in pilot-symbol blocks helps the synchronization and channel-estimation procedures performed at the receiver, e.g., receiver 190, to be robust in the presence of transmission impairments, such as chromatic dispersion (CD) and/or polarization mode dispersion (PMD). The nonuse of cyclic prefixes in phase estimation blocks helps to minimize the transmission overhead and thus achieve relatively high payload-data throughput. Channel-compensation procedures applied to the CP-free phase estimation blocks rely on the channel information obtained from pilot-symbol blocks.

FQP Modulation Format

Figure 11:
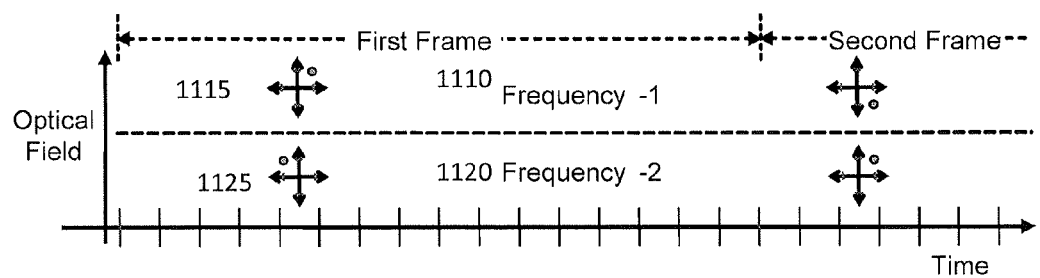
FIG. 11 illustrates a dual frequency, quadrature, pulse position modulation (FQP) format according to another embodiment.

According to a further aspect of the application, a method and architecture are described for further improving receiver sensitivity and/or capacity performance. According to an embodiment as shown in FIG. 11, two separate optical frequencies 1110 and 1120 are used to send two signals 1115 and 1125 instead of employing two polarizations over an optical field. This will be referred to as a frequency quadrature PPM (FQP) modulation format. Namely, the information will simultaneously be sent on two frequencies/wavelengths. Since FQP sends the same two independent data streams on two optical frequencies that PQP Classic sends on two optical polarizations, both will have about the same capacity, e.g., bits/sec, and theoretical sensitivity as PQP. In addition, however, FQP can operate on a single-polarization link.

Figure 12:
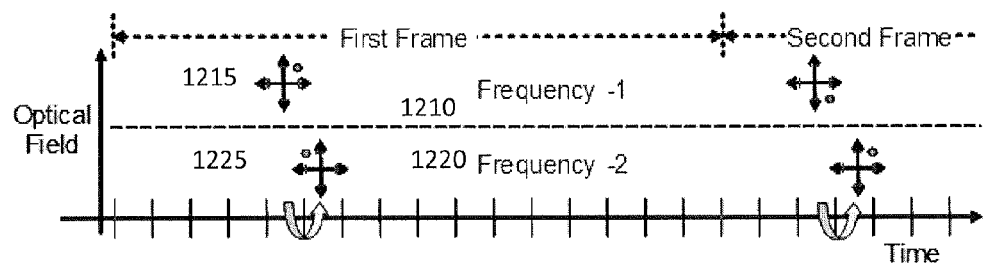
FIG. 12 illustrates yet another FQP modulation format according to an embodiment.

In one embodiment, for example, in situations where the modulation format calls for two QPSK symbols to simultaneously be sent on two separate wavelengths, a modified FQP technique may be employed. Namely, a variety of undesirable nonlinear products, such as for example, 4-wave mixing (FWM), may occur if the QPSK symbols are on the same fiber and/or the same HPOA. In general, FWM can occur when high-power optical signals at two or more wavelengths physically overlap in an optical fiber. It can occur even in Free-space optical links, because of the very high powers in fiber-based HPOAs and their connections to the emitting aperture generate FWM. In the embodiment in FIG. 11, the optical signals 1115 and 1125 are at different wavelengths, are transmitted through the same HPOA and occur at the same time, which means they can generate FWM. In such instances, according to an embodiment as illustrated in FIG. 12, the QPSK symbols are rotated one timeslot in the Frequency-2 data stream relative to the QPSK symbols in the Frequency-1 data stream. By so doing, the QPSK symbols in the two frames do not coincide. This greatly reduces and preferably eliminates FWM as well as some other non-linearities, for example, Modulation Instability (MI) and cross-phase Modulation (XPM).

In an exemplary embodiment, it is envisaged that the choice of rotating the symbols by one timeslot is arbitrary. That is, rotation can be by any nonzero value of M. At the receiver, when determining which timeslot in the frame has the maximum energy, the rotation of timeslots can be undone numerically. This is a very simple task for a digital receiver to accomplish. Thus, the rotation and de-rotation solves a serious optical nonlinearity problem, at very low cost.

Moreover, rotating the QPSK symbol by one timeslot is different from delaying the QPSK symbol by one timeslot according to the embodiments disclosed herein. This can be explained by way of an example where the QPSK symbol in Frequency-1 occurs in the last timeslot in the frame. If the Frequency-2 symbol is rotated, it will occur in the first timeslot of the original frame. On the other hand, if it is delayed, it will occur in the first timeslot of the next frame. Delaying would be disadvantageous because it may possibly lead to a collision. As shown in Table 1 above, FQP offers essentially the same sensitivity as PQP Classic in a single-polarization environment. High sensitivity may be realized in exchange of a modest increase in subsystem complexity.

Figure 13:
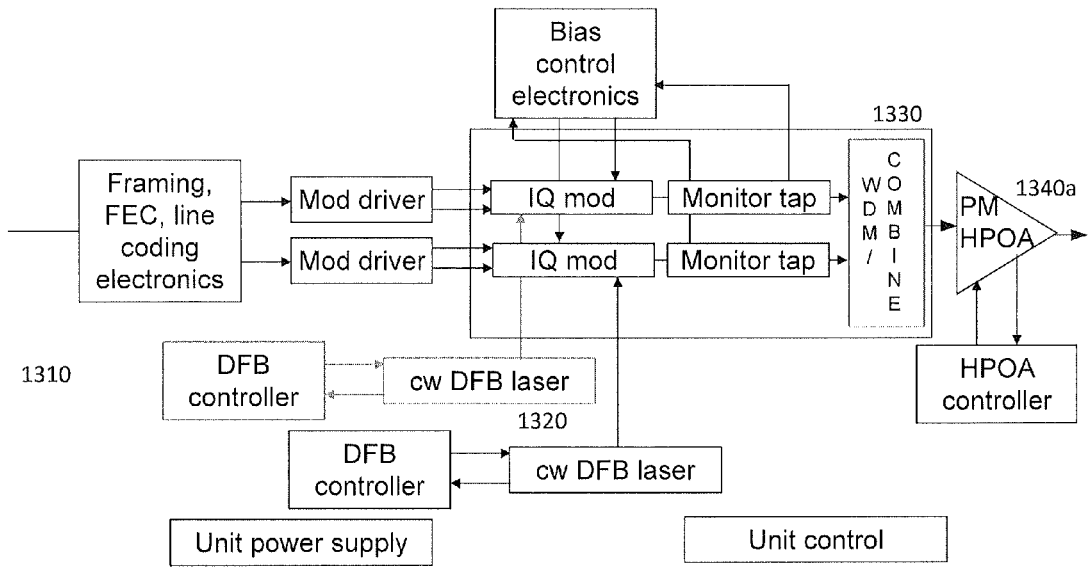
FIG. 13 illustrates a dual FQP transmitter according to an embodiment.
Figure 14:
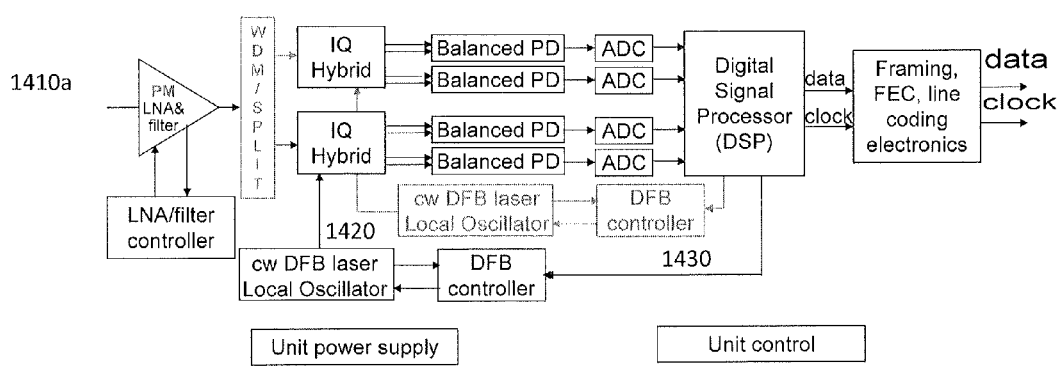
FIG. 14 illustrates a dual FQP receiver according to an embodiment.

According to even a further embodiment, a transmitter used for FQP is illustrated in FIG. 13 and a receiver is illustrated in FIG. 14. As shown, the FQP transmitter and receiver have a different architecture from the transmitter and receiver for PQP Classic illustrated in FIG. 1. Specifically, the FQP transmitter 1300 includes an additional DFB controller 1310 and cw DFB laser 1320. In addition, there is a WDM/Combiner 1330 and a polarization maintaining component 1340a in the HPOA 1340. The receiver 1400 includes a polarization maintaining component 1410a in the LNA & Filter 1410, a WDM/Splitter 1415, an additional cw DFB laser Local Oscillator 1420 and DFB controller 1430.

In a further embodiment, at the symbol level, one 1pQ-16PPM symbol will require 16 slots and have a single polarization-QPSK pulse at one slot position. The slot position and the phase modulation of each pulse modulated in the slot position are based on the data desired to be transmitted. A n-th phase estimation block (Bn) is created by packing ten (10) 1pQ-16PPM symbols (followed by an appended pilot symbol (P). The pilot symbol, occupying only one time slot, may be inserted to assist phase estimation (PE). The representative frame is formed from three pilot-symbol blocks (T1, T2, T3) and one hundred phase estimation blocks (B1, B2, . . . B100).

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. An optical communication method comprising:
receiving a signal at a single-polarization receiver;
detecting, through the single-polarization receiver, the signal including a symbol with a pulse position modulation (PPM) pulse and an additional modulation;
decoding a first nonzero portion of bits carried by the symbol based on a position of the PPM pulse; and
decoding a second nonzero portion of the bits at the position through an additional modulation.

2. The method of claim 1, wherein the first portion of bits includes $\log_2(M)$ bits, and the second portion of bits includes 4 bits.

3. The method of claim 1, wherein the position includes a slot 'm' in a timeframe ranging from 2 to 32.

4. The method of claim 3, wherein the step of decoding the first portion of bits includes determining a first set of slots of plural slot positions for the symbol, the first set having the greatest energy for the symbol, and correlating the first set to a corresponding bit pattern.

5. The method of claim 1, wherein the additional modulation is selected from phase-shift keying (PSK) modulation, Quadrature Phase Shift Keying (QPSK), quadrature-amplitude modulation (QAM) and combinations thereof.

6. The method of claim 1, wherein the receiver is a coherent receiver.

7. The method of claim 1, wherein the symbol includes plural PPM pulses having additional modulation in plural, corresponding positions.

8. The method of claim 1, wherein the signal exhibits a theoretical receiver sensitivity less than 6.5 dB at a Bit Error Rate greater than $10^{-3}$.

9. The method of claim 1, wherein the signal exhibits a data rate reduction less than about 50% of that exhibited for a PQP Classic modulation format.

10. The method of claim 9, wherein the signal exhibits a data rate reduction less than about 40% of that exhibited for PQP Classic modulation format.

11. The method of claim 1, wherein the signal exhibits a theoretical receiver sensitivity less than a 1 dB photons per bit difference, when measured at a BER of $10^{-3}$, in relation to a PQP Classic coherent receiver.

12. An apparatus comprising:
a single-polarization receiver front end that detects a signal including a symbol having a pulse position modulation (PPM) pulse;
an analog-to-digital convertor (ADC) that converts the detected signal into a digital component; and
a processor, operably coupled to the single-polarization receiver and the ADC, the processor configured to decode a first non-zero portion of a plurality of bits carried by the symbol based on a position of the PPM pulse.

13. The apparatus of claim 12, further comprising:
a polarization maintaining (PM) component operably coupled to the ADC.

14. An optical communication method, comprising:
receiving a signal at a receiver;
detecting, through the receiver, a signal including a symbol with an independent pulse position modulation (PPM) pulse and an additional modulation;
recovering two polarization components from the detected signal, each of the polarization components carrying independent data in different timeslots;
decoding a first portion of bits carried by the symbol based on a position of the PPM pulse; and
decoding a second portion of the bits based on the additional modulation.

15. The method of claim 14, wherein the signal exhibits a receiver sensitivity, measured at a bit error rate of $10^{-3}$, within 10% of a receiver sensitivity of a signal having polarization components carrying dependent data.

16. The method of claim 14, wherein the signal exhibits a capacity more than about 10% of a signal for a PQP Classic receiver operating with the same speed analog to digital converter.

17. An optical communication method, comprising:
receiving a signal at a coherent receiver;
detecting, through the coherent receiver, the signal including a symbol with a pulse position modulation (PPM) pulse;
recovering a first and a second frequency of the detected signal; and
decoding a first non-zero portion of bits carried by the symbol based on a position of the PPM pulse.

18. The method of claim 17, further comprising:
decoding a second non-zero portion of a plurality of bits carried by the symbol based on an additional modulation in the first frequency.

19. The method of claim 17, wherein the position includes a timeslot in a frame, and the symbol in the timeslot of the first frequency is rotated by another timeslot with respect to a second symbol in the second frequency.

20. The method of claim 19, wherein the signal exhibits a receiver sensitivity less than about 5.7 dB, at 2 timeslots in a frame and a Bit Error Rate greater than $10^{-3}$.

* * * * *